US012599065B1

(12) United States Patent
Wang

(10) Patent No.: US 12,599,065 B1
(45) Date of Patent: Apr. 14, 2026

(54) TELESCOPIC STRUCTURE, TELESCOPIC BLOWER, AND TELESCOPIC ELECTRIC CHAINSAW

(71) Applicant: Sihao Huang, Shantou (CN)

(72) Inventor: Kangning Wang, Yongkang (CN)

(73) Assignee: Sihao Huang, Shantou (CN)

( * ) Notice: Subject to any disclaimer, the term of this patent is extended or adjusted under 35 U.S.C. 154(b) by 0 days.

(21) Appl. No.: 19/231,634

(22) Filed: Jun. 9, 2025

(30) Foreign Application Priority Data

Dec. 9, 2024 (CN) .......................... 202423029902.6

(51) Int. Cl.
| | |
|---|---|
| *A01G 3/08* | (2006.01) |
| *B25F 5/02* | (2006.01) |
| *B27B 17/02* | (2006.01) |
| *A01G 20/47* | (2018.01) |

(52) U.S. Cl.
CPC ................ *A01G 3/086* (2013.01); *B25F 5/02* (2013.01); *B27B 17/02* (2013.01); *A01G 20/47* (2018.02)

(58) Field of Classification Search
CPC .......... A01G 3/08; A01G 3/086; B27B 17/00; B27B 17/02; B25F 5/02
USPC ........................................ 30/296.1, 381–387
See application file for complete search history.

(56) References Cited

U.S. PATENT DOCUMENTS

| | | | | | |
|---|---|---|---|---|---|
| 4,505,040 | A | * | 3/1985 | Everts ........................ | B25F 5/02 |
| | | | | | 30/296.1 |
| 4,654,971 | A | * | 4/1987 | Fettes ....................... | A01G 3/08 |
| | | | | | 30/296.1 |

| | | | | | |
|---|---|---|---|---|---|
| 4,760,646 | A | * | 8/1988 | Siegler .................... | B27B 17/02 |
| | | | | | 30/382 |
| 4,916,818 | A | * | 4/1990 | Panek ...................... | A01G 3/08 |
| | | | | | 30/296.1 |
| 4,924,573 | A | * | 5/1990 | Huddleston ............ | A01G 3/086 |
| | | | | | 30/296.1 |
| 4,944,711 | A | * | 7/1990 | Hironaka ............... | A01D 34/90 |
| | | | | | 30/296.1 |
| 4,991,298 | A | * | 2/1991 | Matre ...................... | A01G 3/08 |
| | | | | | 30/296.1 |
| 5,819,418 | A | * | 10/1998 | Uhl ......................... | A01G 3/08 |
| | | | | | 30/296.1 |

(Continued)

FOREIGN PATENT DOCUMENTS

| | | | | | |
|---|---|---|---|---|---|
| CA | 3210843 | A1 | * | 3/2024 | ............. B27B 17/00 |
| CN | 101702534 | A | * | 5/2010 | ............. B27B 17/02 |

(Continued)

*Primary Examiner* — Jason Daniel Prone
(74) *Attorney, Agent, or Firm* — Hemisphere Law, PLLC

(57) ABSTRACT

A telescopic structure includes a handle, a main telescopic body, and a telescopic rod assembly disposed between the handle and the main telescopic body. The telescopic rod assembly includes an outer tube and an inner tube group. An end of the outer tube is connected to the handle, the inner tube group is movably disposed inside the outer tube, and an end of the inner tube group is connected to the main telescopic body. A first limiting component is disposed on an outer periphery of the telescopic rod assembly and is configured to limit movement of the inner tube group. A side wall of the telescopic rod assembly defines multiple limiting holes configured to insert the first limiting part. Compared to the related art, it eliminates the need for auxiliary equipment to climb to high places for work, thereby enhancing safety and reliability while also improving work efficiency.

4 Claims, 18 Drawing Sheets

(56)                References Cited

U.S. PATENT DOCUMENTS

| | | | | |
|---|---|---|---|---|
| 5,884,403 A * | 3/1999 | Rogers | A01G 3/08 | |
| | | | 30/296.1 | |
| 5,926,961 A * | 7/1999 | Uhl | A01G 3/086 | |
| | | | 30/296.1 | |
| 6,474,747 B2 * | 11/2002 | Beaulieu | F16B 7/042 | |
| | | | 30/296.1 | |
| 6,488,511 B1 * | 12/2002 | Stewart | B27B 17/0008 | |
| | | | 30/296.1 | |
| 6,904,687 B1 * | 6/2005 | Hill, Sr. | A01G 3/086 | |
| | | | 30/296.1 | |
| 7,484,300 B2 * | 2/2009 | King | A01G 3/08 | |
| | | | 30/296.1 | |
| 8,136,254 B2 * | 3/2012 | Gieske | A01G 3/08 | |
| | | | 30/296.1 | |
| 9,591,809 B2 * | 3/2017 | Gieske | A01G 3/086 | |
| 10,166,691 B2 * | 1/2019 | Föhrenbach | A01G 3/086 | |
| 10,302,142 B2 * | 5/2019 | Densborn | A01G 3/086 | |
| 10,390,493 B2 * | 8/2019 | Sinyard | A01G 3/086 | |
| 11,618,149 B2 * | 4/2023 | Banholzer | B25F 5/02 | |
| | | | 173/217 | |
| 11,667,027 B2 * | 6/2023 | Sugiura | B25F 5/02 | |
| | | | 173/170 | |
| 11,794,371 B1 * | 10/2023 | Hu | B27B 17/02 | |
| 11,984,772 B1 * | 5/2024 | Hu | A01G 3/086 | |
| 2008/0184568 A1 * | 8/2008 | Gieske | B25F 5/02 | |
| | | | 30/383 | |
| 2008/0196256 A1 * | 8/2008 | Gieske | A01G 3/08 | |
| | | | 30/296.1 | |
| 2012/0110863 A1 * | 5/2012 | Brown | B27B 17/02 | |
| | | | 30/382 | |
| 2023/0202017 A1 * | 6/2023 | Sabic | A01G 3/086 | |
| | | | 173/217 | |
| 2023/0211519 A1 * | 7/2023 | Markus | B27B 17/02 | |
| | | | 30/123.4 | |
| 2023/0271345 A1 * | 8/2023 | Ebner | B27B 17/02 | |
| | | | 30/381 | |
| 2023/0301240 A1 * | 9/2023 | Osterchill | A01G 3/086 | |
| 2023/0330888 A1 * | 10/2023 | Greene | A01G 3/086 | |
| 2024/0075648 A1 * | 3/2024 | Zhu | B27B 17/08 | |
| 2024/0351182 A1 * | 10/2024 | Xu | A01G 3/086 | |
| 2024/0357972 A1 * | 10/2024 | Smith | A01G 3/086 | |
| 2025/0249620 A1 * | 8/2025 | Huang | B27B 17/00 | |

FOREIGN PATENT DOCUMENTS

| | | | | | |
|---|---|---|---|---|---|
| CN | 113246226 A | * | 8/2021 | | A01G 3/086 |
| CN | 117441509 A | * | 1/2024 | | A01G 3/086 |
| CN | 119073114 A | * | 12/2024 | | A01G 3/086 |
| CN | 222340087 U | * | 1/2025 | | A01G 3/08 |
| DE | 202004014818 U1 | * | 12/2004 | | A01G 3/08 |
| EP | 4437835 A1 | * | 10/2024 | | A01G 3/086 |
| EP | 4520493 A1 | * | 3/2025 | | B25F 5/02 |
| WO | WO-2020088890 A1 | * | 5/2020 | | A01G 3/086 |
| WO | WO-2023226840 A1 | * | 11/2023 | | A01G 3/086 |

* cited by examiner

TELESCOPIC STRUCTURE, TELESCOPIC BLOWER, AND TELESCOPIC ELECTRIC CHAINSAW

TECHNICAL FIELD

The disclosure relates to the technical field of gardening tools, and particularly to a telescopic structure, a telescopic blower, and a telescopic electric chainsaw.

BACKGROUND

When personnel in orchards, forestry, and landscaping need to prune branches, they usually use electric chainsaws or other related tools. Taking tree branch pruning as an example for some relatively short plants, pruning can be accomplished with standard handheld pruning machines or electric chainsaws. However, when it comes to pruning tall trees, it is necessary to either manually climb to a higher position or use a lifting device to elevate the user to a required height for pruning. Both methods can lead to unnecessary trouble, increase labor risks, or raise labor costs. Therefore, there is an urgent need to improve the existing gardening tools.

SUMMARY

A purpose of the disclosure is to provide a telescopic structure, a telescopic blower, and a telescopic electric chainsaw, which solves the problem of short operable distance of the gardening tools through a telescopic rod assembly.

The disclosure is achieved by the technical solution as follows.

In an embodiment, a telescopic electric chainsaw includes a handle, a main telescopic body, and a telescopic rod assembly. The telescopic rod assembly is disposed between the handle and the main telescopic body, and the telescopic rod assembly includes an outer tube and an inner tube group. An end of the outer tube is connected to the handle, the inner tube group is movably disposed inside the outer tube, and an end of the inner tube group is connected to the main telescopic body. A first limiting component is disposed on an outer periphery of the telescopic rod assembly and is configured to limit movement of the inner tube group. The first limiting component is movably disposed inside the handle, an end of the first limiting component extending out of the handle is provided with an unlocking button, and an interior of the first limiting component includes a first limiting part. A side wall of the telescopic rod assembly defines multiple limiting holes configured to be inserted with the first limiting part.

In an embodiment, a telescopic electric chainsaw includes a handle, a main blower body, and a telescopic rod assembly. The telescopic rod assembly is disposed between the handle and the main blower body, and the telescopic rod assembly includes an outer tube and an inner tube group. An end of the outer tube is connected to the handle, the inner tube group is movably disposed inside the outer tube, and an end of the inner tube group is connected to the main blower body. A first limiting component is disposed on an outer periphery of the telescopic rod assembly and is configured to limit movement of the inner tube group. The first limiting component is movably disposed inside the handle, an end of the first limiting component extending out of the handle is provided with an unlocking button, and an interior of the first limiting component includes a first limiting part. A side wall of the telescopic rod assembly defines multiple limiting holes configured to be inserted with the first limiting part.

In an embodiment, a telescopic electric chainsaw includes a handle, a main chainsaw body, and a telescopic rod assembly. The telescopic rod assembly is disposed between the handle and the main chainsaw body, and the telescopic rod assembly includes an outer tube and an inner tube group. An end of the outer tube is connected to the handle, the inner tube group is movably disposed inside the outer tube, and an end of the inner tube group is connected to the main chainsaw body. A first limiting component is disposed on an outer periphery of the telescopic rod assembly and is configured to limit movement of the inner tube group. The first limiting component is movably disposed inside the handle, an end of the first limiting component extending out of the handle is provided with an unlocking button, and an interior of the first limiting component includes a first limiting part. A side wall of the telescopic rod assembly defines multiple limiting holes configured to be inserted with the first limiting part.

In an embodiment, the inner tube group includes a first inner tube and a second inner tube movably disposed inside the first inner tube, and a limiting assembly is disposed between the first inner tube and the second inner tube.

In an embodiment, the limiting assembly includes a limiting sleeve disposed on an outer periphery of the first inner tube, and a second limiting component movably disposed inside the limiting sleeve, and a lower end of the second limiting component extending out of the limiting sleeve is provided with an unlocking part. An interior of the second limiting component includes a second limiting part, and an upper end and a lower end of the second inner tube define fourth limiting holes, respectively, and the fourth limiting holes are configured to be inserted with the second limiting part.

In an embodiment, a first reset spring is disposed between and abuts against the second limiting component and the limiting sleeve, and the first reset spring is configured to make the second limiting part tend to move to the fourth limiting holes. A front side of the handle includes a limiting wall configured to allow the lower end of the second limiting component to abut against the limiting wall, and a front side of the limiting wall includes an inclined sliding surface.

In an embodiment, a first limiting block is disposed on an upper end of the outer tube, a side of the first inner tube defines a first sliding slot configured to allow the first limiting block to slide in the first sliding slot, a first sliding block is disposed on a lower end of the first inner tube, and a lower end of the first sliding block is disposed in the first sliding slot.

In an embodiment, an upper end of the second inner tube is connected to the main chainsaw body, a second limiting block is disposed on the lower end of the second inner tube, a side cover is disposed on a side of the limiting sleeve, and an interior of the side cover includes a third limiting part configured to allow the second limiting block to abut against the third limiting part.

In an embodiment, the multiple limiting holes include: a first limiting hole, second limiting holes, and a third limiting hole. An upper end of the outer tube defines the first limiting hole, an upper end and a lower end of the first inner tube defines the second limiting holes, respectively, and an upper end of the second inner tube defines the third limiting hole.

In an embodiment, a second reset spring is disposed between and abuts against the handle and a lower end of the first limiting component, and the second reset spring is configured to make the first limiting part tend to move to the multiple limiting holes.

The beneficial effects of the disclosure are as follows.

The disclosure, through a design of telescopic rod assembly, enables the use of the main telescopic body by extending it during actual use, making it easy to operate in difficult to reach positions. Compared with the related art, it does not require the use of additional auxiliary equipment for operation, making it safer, more reliable, and more efficient.

Figure 1:
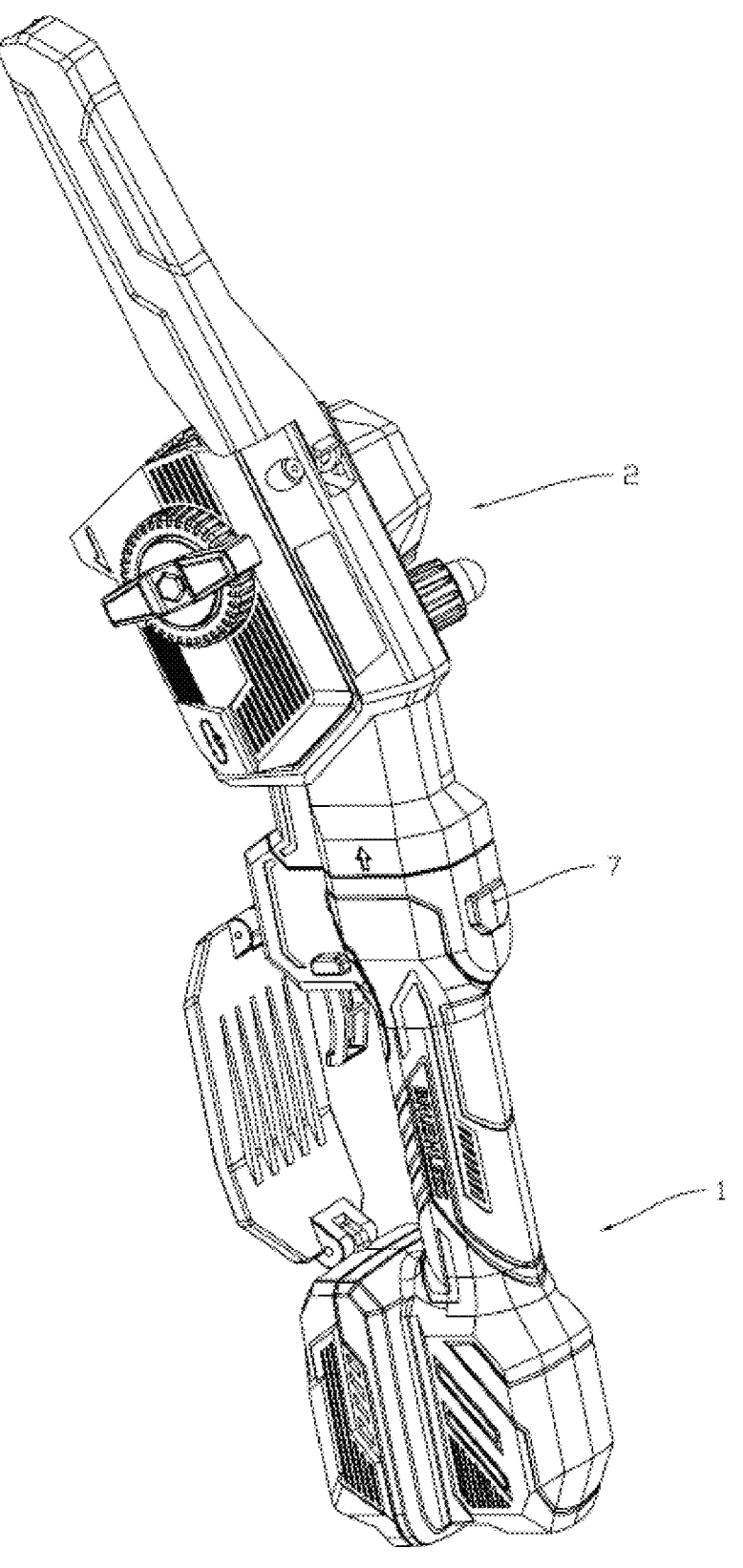
FIG. 1 illustrates a three-dimensional schematic structural diagram of a telescopic electric chainsaw after retracted of the disclosure.

DESCRIPTION OF REFERENCE NUMERALS 1. handle; 2. main chainsaw body; 3. telescopic rod assembly; 4. outer tube; 5. inner tube group; 6. first limiting component; 7. unlocking button; 8. first limiting part; 9. first inner tube; 10. second inner tube; 11. limiting assembly; 12. limiting sleeve; 13. second limiting component; 14. unlocking part; 15. second limiting part; 16. fourth limiting hole; 17. first reset spring; 18. limiting wall; 19. inclined sliding surface; 20. first limiting block; 21. first sliding slot; 22. first sliding block; 23. second limiting block; 24. side cover; 25. third limiting part; 26. first limiting hole; 27. second limiting hole; 28. third limiting hole; 29. second reset spring; 30. main blower body.

DETAILED DESCRIPTION OF EMBODIMENTS

The specific embodiments of the disclosure will be further explained in detail with reference to the attached drawings.

Embodiment 1

In an embodiment, as shown in FIGS. 1 to 18, a telescopic structure includes a handle 1, a main telescopic body, and a telescopic rod assembly 3. The telescopic rod assembly 3 is disposed between the handle 1 and the main telescopic body. The telescopic rod assembly 3 includes an outer tube 4 and an inner tube group 5. An end of the outer tube 4 is connected to the handle 1, the inner tube group 5 is movably disposed inside the outer tube 4, and an end of the inner tube group 5 is connected to the main telescopic body. A first limiting component 6 is disposed on an outer periphery of the telescopic rod assembly 3 and is configured to limit movement of the inner tube group 5. The first limiting component 6 is movably disposed inside the handle 1, an end of the first limiting component 6 extending out of the handle 1 is provided with an unlocking button 7, and an interior of the first limiting component 6 includes a first limiting part 8. A side wall of the telescopic rod assembly 3 defines multiple limiting holes configured to be inserted with the first limiting part 8, thereby limiting a movement of the telescopic rod assembly 3. The movement of the telescopic rod assembly 3 can be released by operating the unlocking button 7, thereby adjusting the length of the telescopic structure for use.

Through a design of telescopic rod assembly 3, the disclosure enables the use of the main telescopic body by extending it during actual use, making it easy to operate in difficult to reach positions. Compared with the related art, it does not require the use of additional auxiliary equipment for operation, making it safer, more reliable, and more efficient.

It should be noted that the main telescopic body can be any gardening tool, such as a hair dryer, scissors, or a chainsaw.

Embodiment 2

Figure 18:
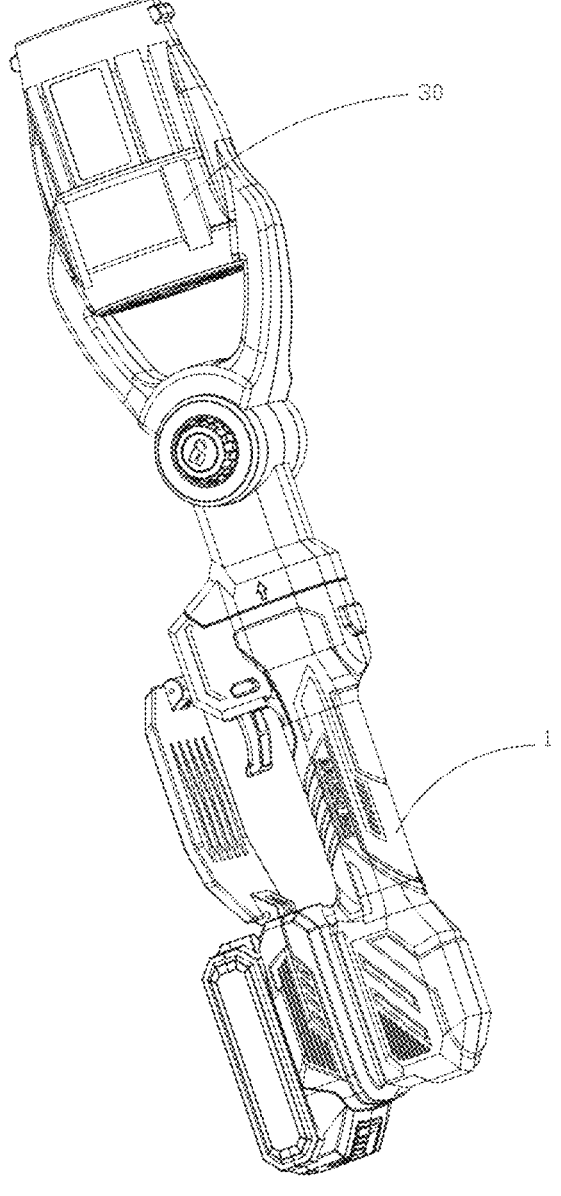
FIG. 18 illustrates a three-dimensional structural diagram of a telescopic blower in the disclosure.
Figure 19:
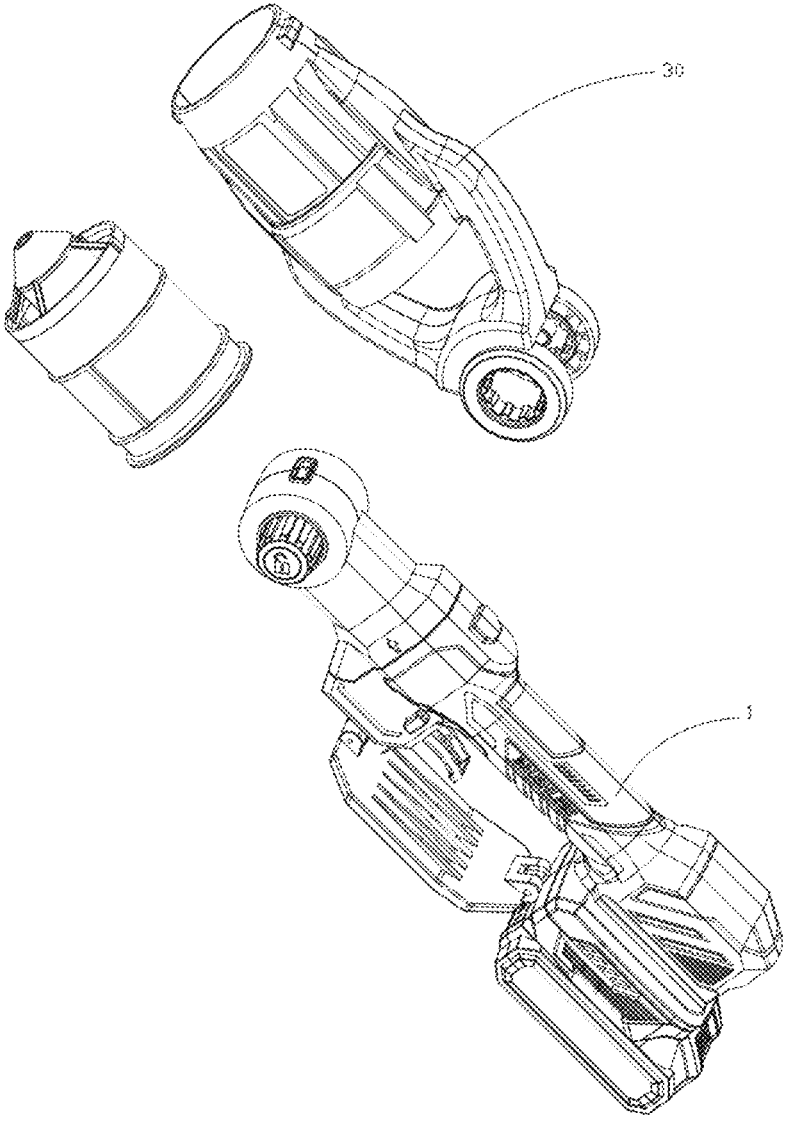
FIG. 19 illustrates a partial exploded diagram of the telescopic blower in the disclosure.

In an embodiment, as shown in FIGS. 18 and 19, a telescopic blower includes a handle 1, a main blower body 30, and a telescopic rod assembly 3. The telescopic rod assembly 3 is disposed between the handle 1 and the main blower body 30. The telescopic rod assembly 3 includes an outer tube 4 and an inner tube group 5. An end of the outer tube 4 is connected to the handle 1, the inner tube group 5 is movably disposed inside the outer tube 4, and an end of the inner tube group 5 is connected to the main blower body 30. A first limiting component 6 is disposed on an outer periphery of the telescopic rod assembly 3 and is configured to limit movement of the inner tube group 5. The first limiting component 6 is movably disposed inside the handle 1, an end of the first limiting component 6 extending out of the handle 1 is provided with an unlocking button 7, and an interior of the first limiting component 6 includes a first limiting part 8. A side wall of the telescopic rod assembly 3 defines multiple limiting holes configured to be inserted with the first limiting part 8, thereby limiting a movement of the telescopic rod assembly 3. The movement of the telescopic rod assembly 3 can be released by operating the unlocking button 7, thereby adjusting the length of the telescopic structure for use.

Through a design of telescopic rod assembly 3, the disclosure enables the use of the main blower body 30 by extending it during actual use, making it easy to operate in difficult to reach positions. Compared with the related art, it does not require the use of additional auxiliary equipment for operation, making it safer, more reliable, and more efficient.

Embodiment 3

In an embodiment, as shown in FIGS. 1 to 18, a telescopic electric chainsaw includes a handle 1, a main chainsaw body 2, and a telescopic rod assembly 3. The telescopic rod assembly 3 is disposed between the handle 1 and the main chainsaw body 2. The telescopic rod assembly 3 includes an outer tube 4 and an inner tube group 5. An end of the outer tube 4 is connected to the handle 1, the inner tube group 5 is movably disposed inside the outer tube 4, and an end of the inner tube group 5 is connected to the main chainsaw body 2. A first limiting component 6 is disposed on an outer periphery of the telescopic rod assembly 3 and is configured to limit movement of the inner tube group 5. The first limiting component 6 is movably disposed inside the handle 1, an end of the first limiting component 6 extending out of the handle 1 is provided with an unlocking button 7, and an interior of the first limiting component 6 includes a first limiting part 8. A side wall of the telescopic rod assembly 3 defines multiple limiting holes configured to be inserted with the first limiting part 8, thereby limiting a movement of the telescopic rod assembly 3. The movement of the telescopic rod assembly 3 can be released by operating the unlocking button 7, thereby adjusting the length of the telescopic electric chainsaw for use.

Through the design of the telescopic rod assembly 3, the disclosure enables the use of the main chainsaw body 2 by extending it during actual use, making it easy to operate in difficult to reach positions. Compared with the related art, it does not require the use of additional auxiliary equipment for operation, making it safer, more reliable, and more efficient.

Figure 2:
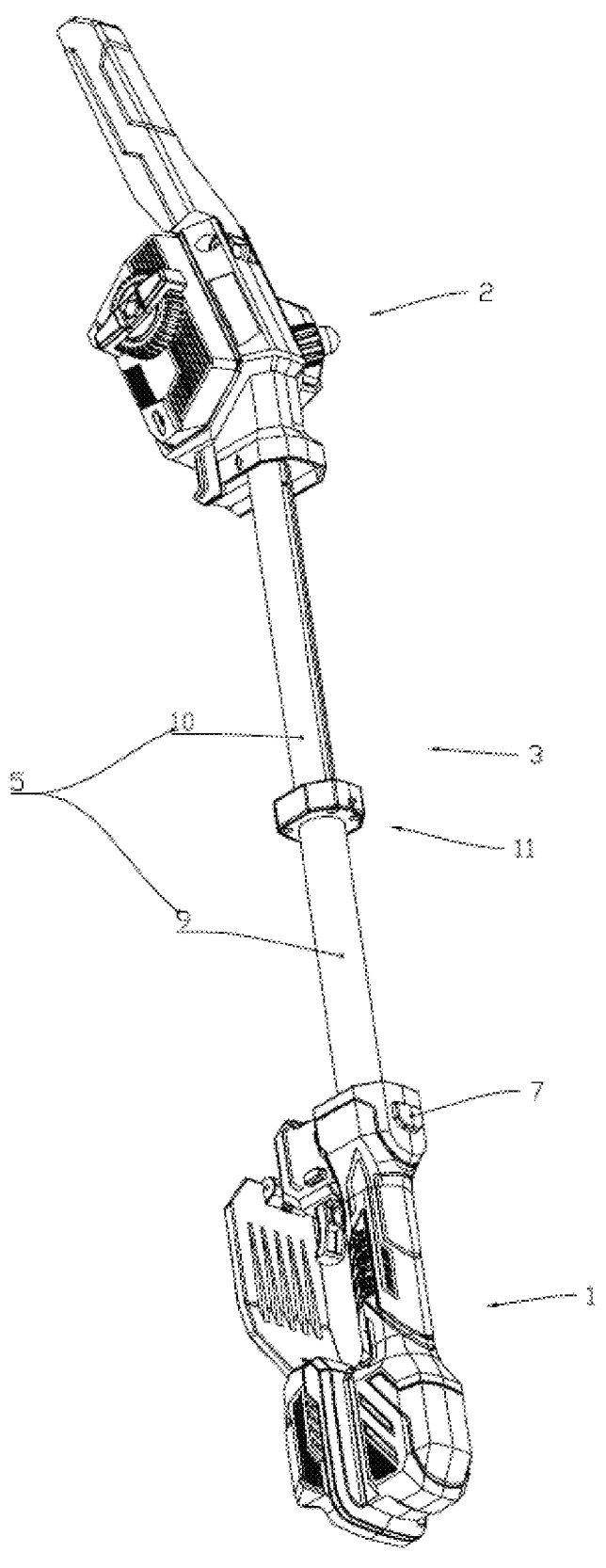
FIG. 2 illustrates a three-dimensional schematic structural diagram of the telescopic electric chainsaw after extending of the disclosure.
Figure 3:
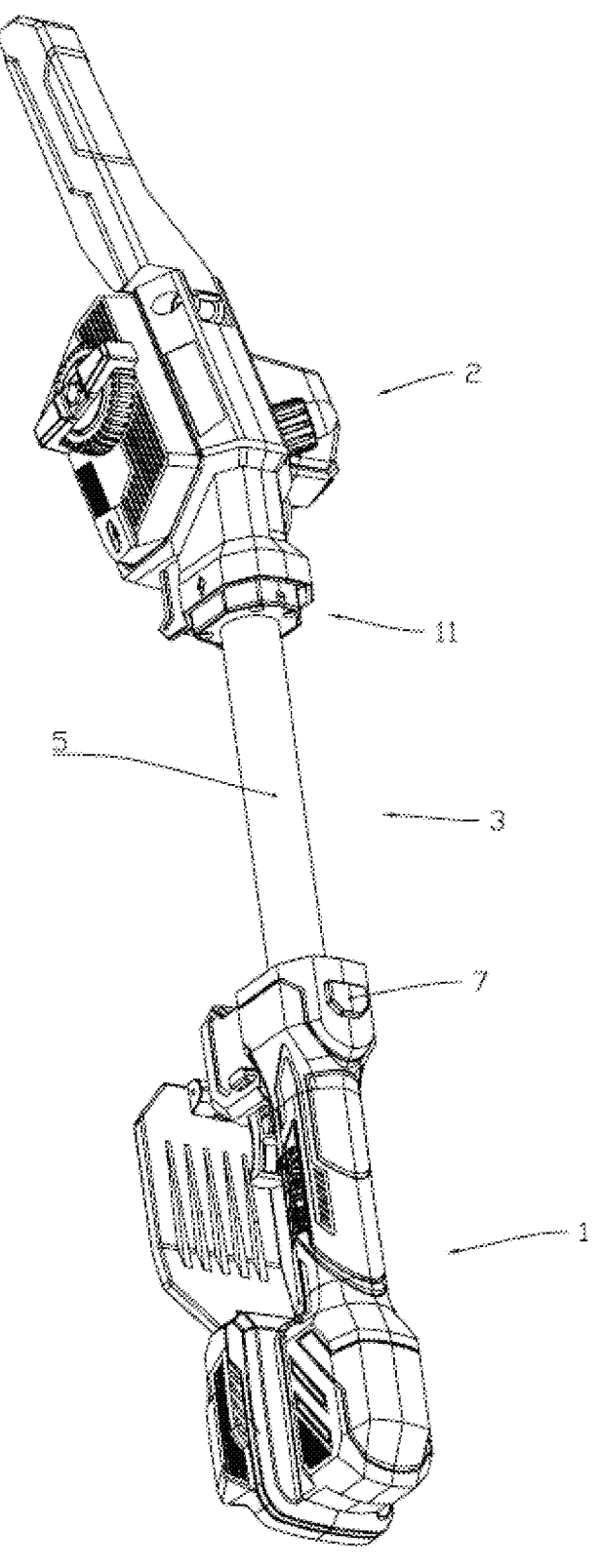
FIG. 3 illustrates a three-dimensional schematic structural diagram of the telescopic electric chainsaw illustrated in FIG. 2 when partially retracted of the disclosure.
Figure 4:
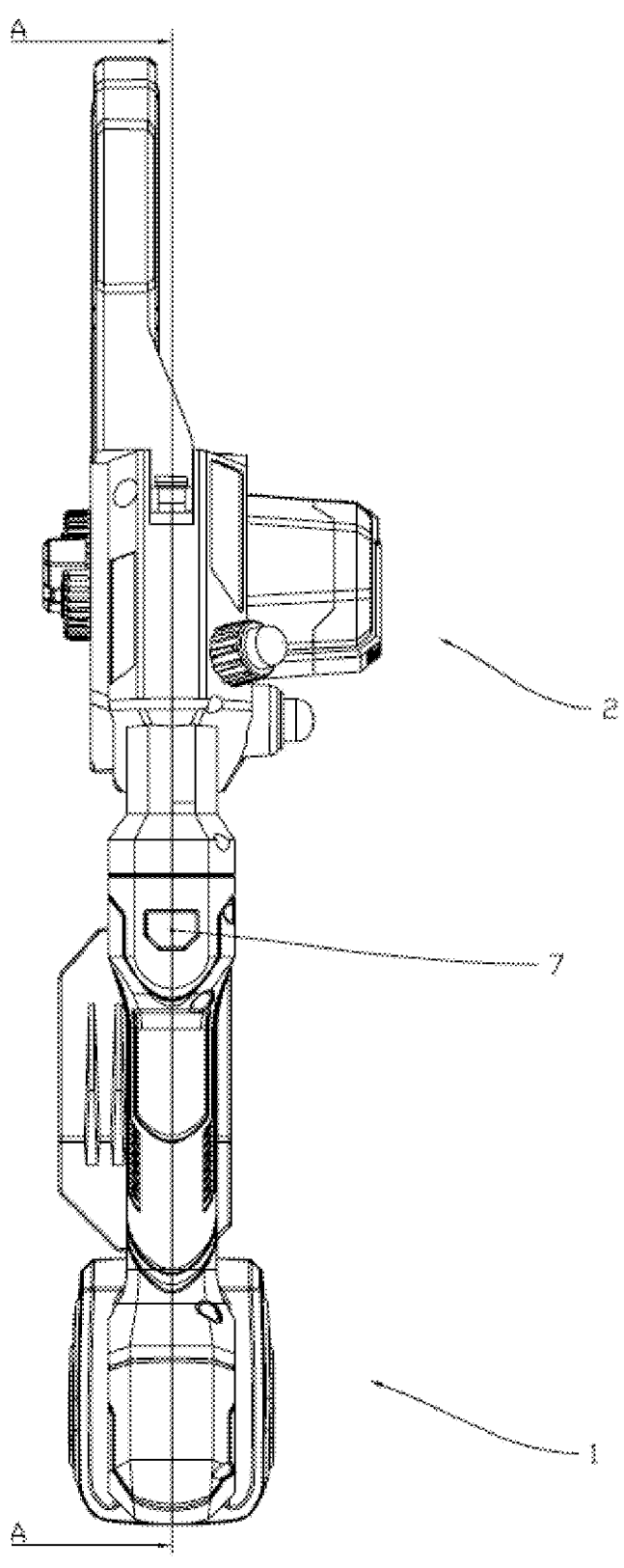
FIG. 4 illustrates a front structural diagram of the telescopic electric chainsaw after retracted of the disclosure.

As shown in FIG. 3, specifically, the telescopic rod assembly 3 of the telescopic electric chainsaw in the disclosure can adopt a two-section design. Depending on different practical application scenarios, as shown in FIG. 2, it can also adopt a three-section design, enabling the electric chainsaw to extend to a greater height.

In an embodiment, when the three-section design is adopted, the inner tube group 5 includes a first inner tube 9 and a second inner tube 10 movably disposed inside the first inner tube 9. A limiting assembly 11 is disposed between second inner tube 10 and the first inner tube 9. By operating the limiting assembly 11, a relative movement between the second inner tube 10 and the first inner tube 9 can be restricted or released, facilitating subsequent use.

Figure 11:
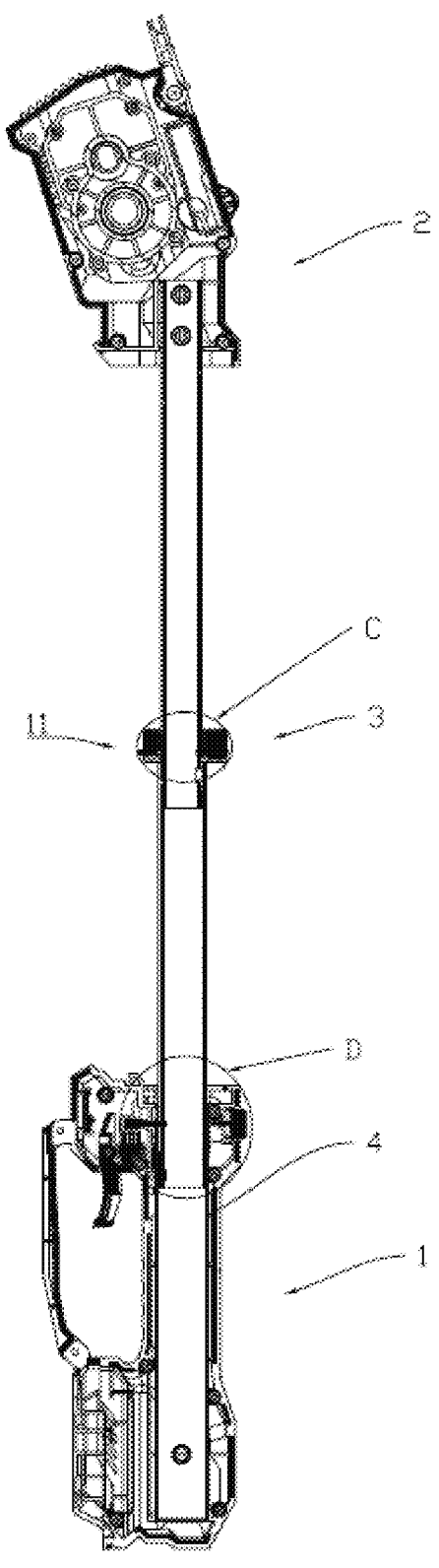
FIG. 11 illustrates a cross-sectional structural diagram taken along a line C-C illustrated in FIG. 10 of the disclosure.
Figure 12:
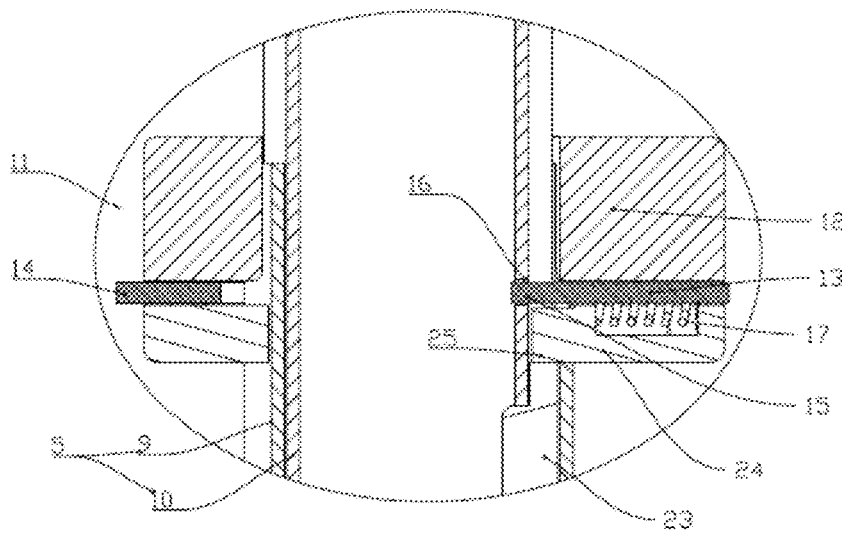
FIG. 12 illustrates an enlarged structural diagram of a portion C illustrated in FIG. 11 of the disclosure.
Figure 13:
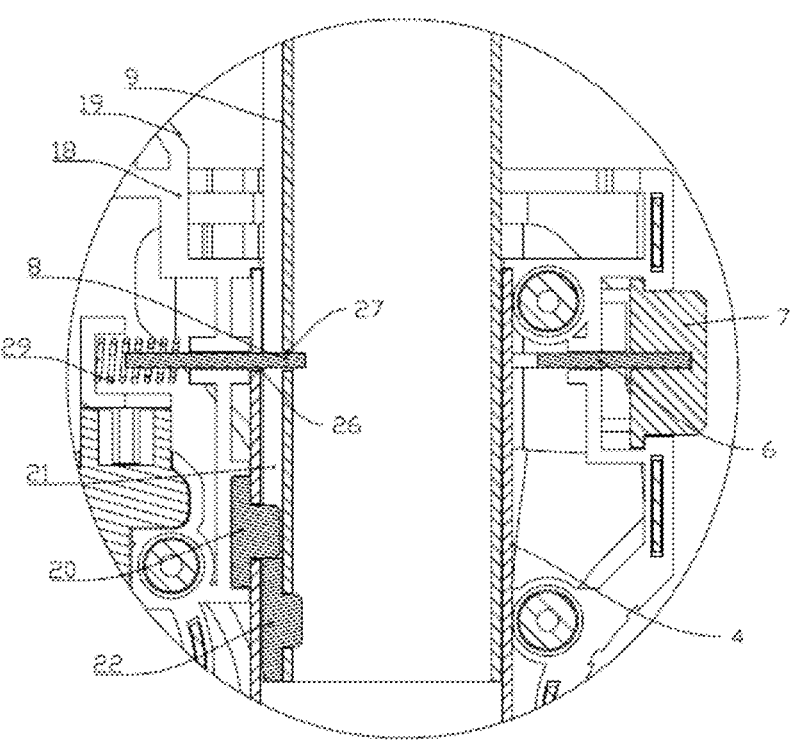
FIG. 13 illustrates an enlarged structural diagram of a portion D illustrated in FIG. 11 of the disclosure.
Figure 14:
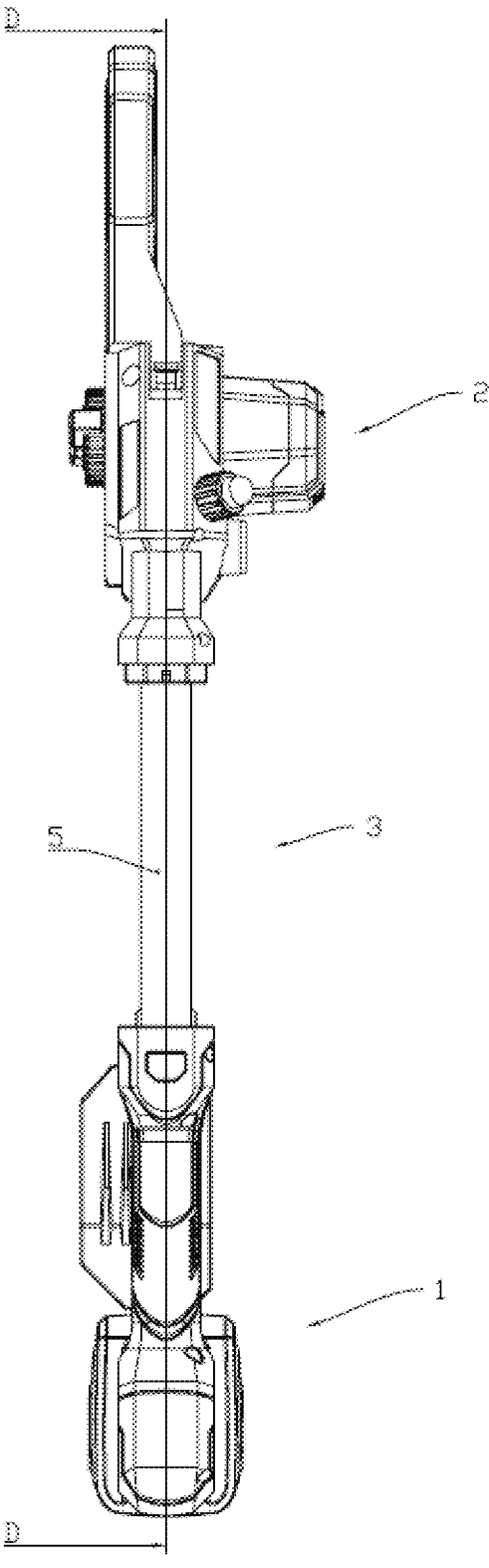
FIG. 14 illustrates a front schematic structural diagram of the telescopic electric chainsaw illustrated in FIG. 2 when partially retracted of the disclosure.
Figure 15:
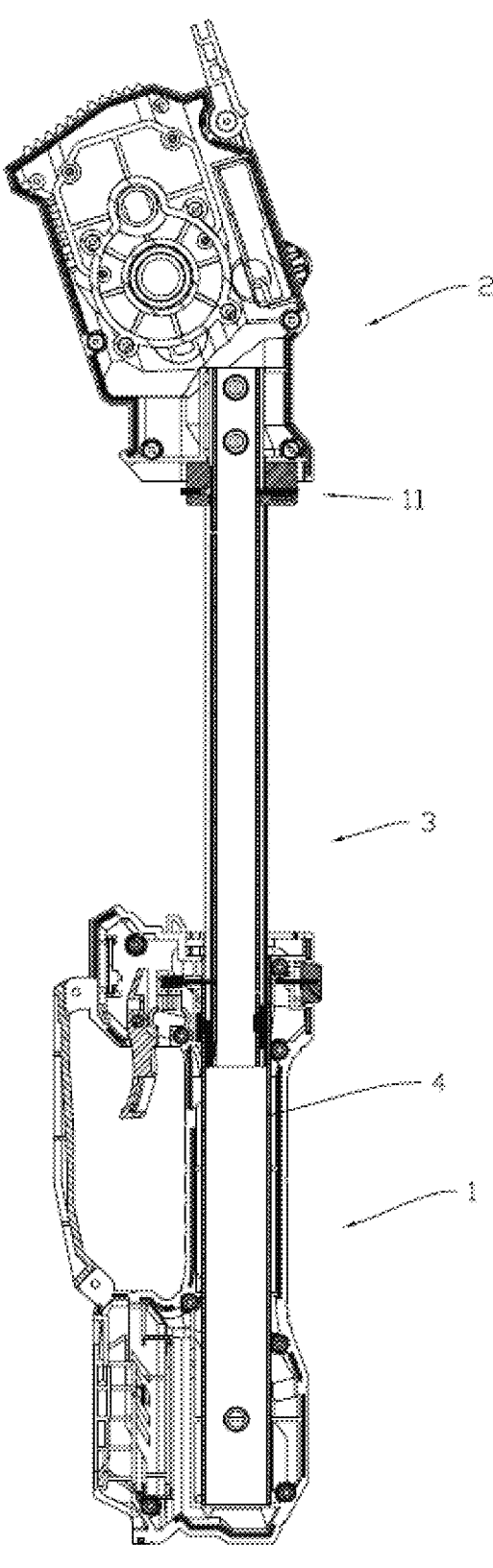
FIG. 15 illustrates a cross-sectional structural diagram taken along a line D-D illustrated in FIG. 14 of the disclosure.
Figure 16:
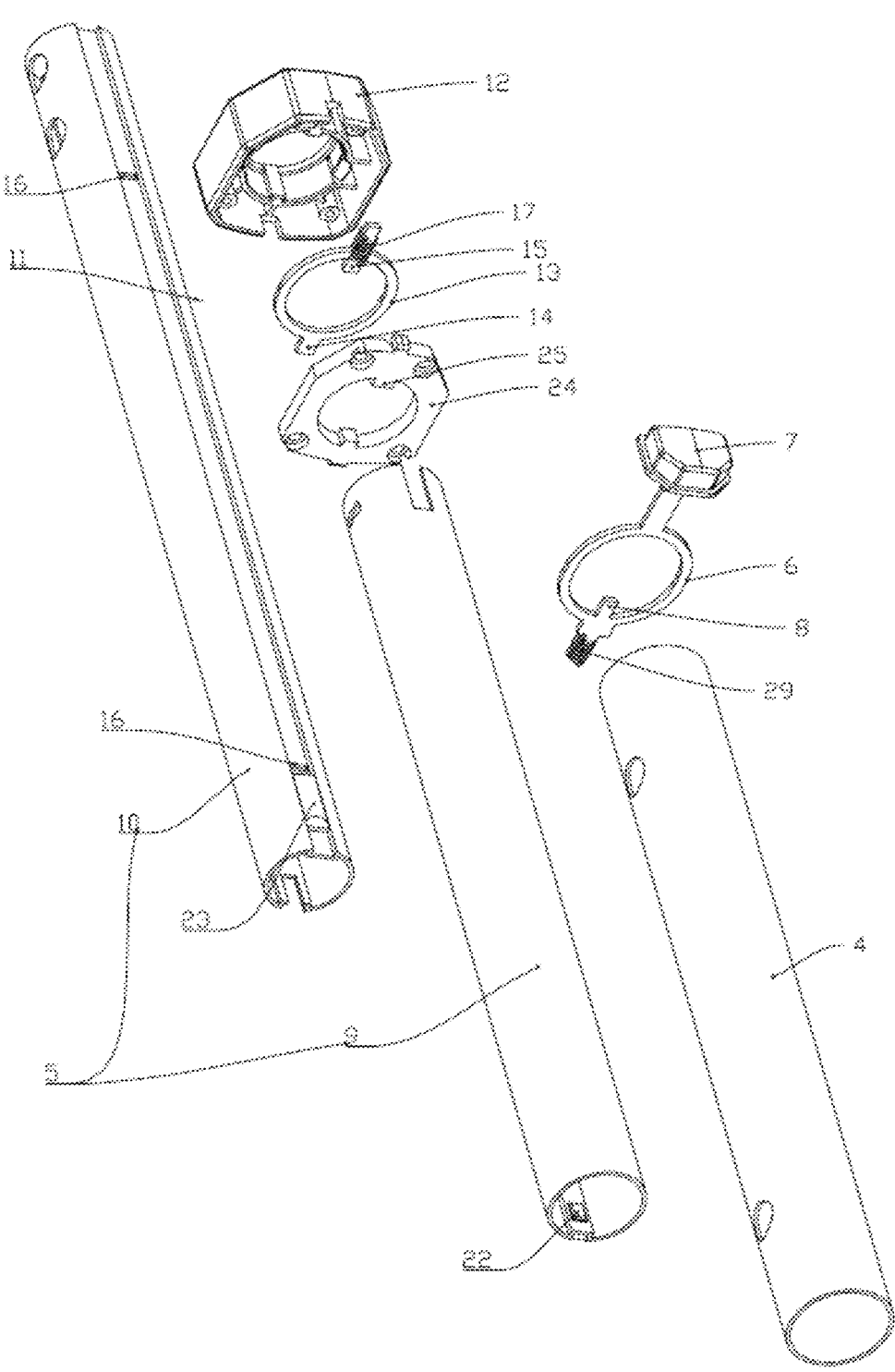
FIG. 16 illustrates a first exploded view of a telescopic rod assembly.
Figure 17:
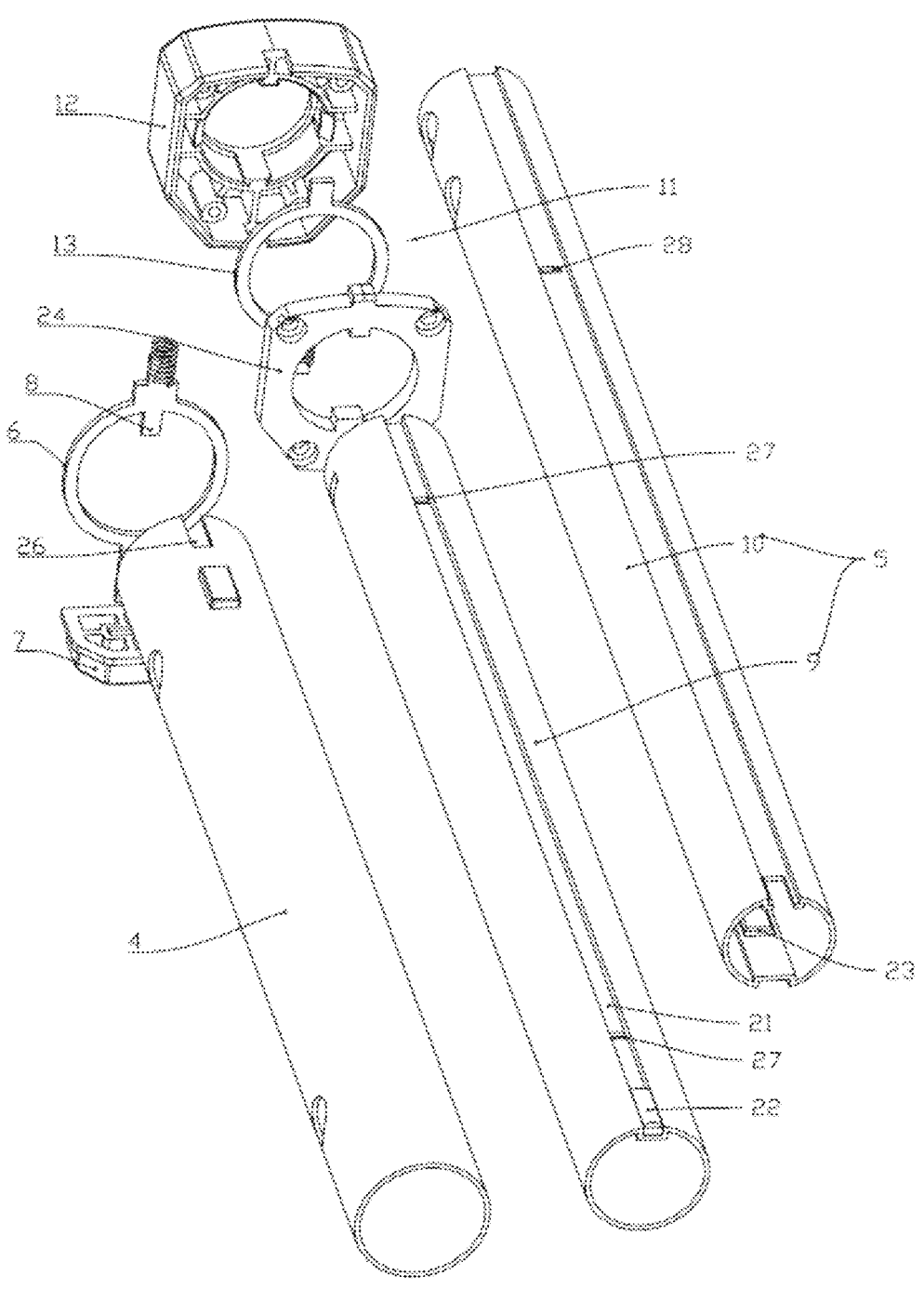
FIG. 17 illustrates a second exploded view of the telescopic rod assembly.

In an embodiment, a first limiting block 20 is disposed on an upper end of the outer tube 4, a side of the first inner tube 9 defines a first sliding slot 21 configured to allow the first limiting block 20 to slide in the first sliding slot 21. By cooperation of the first sliding slot 21 and first limiting block 20, a stability of the relative movement between first inner tube 9 and the outer tube 4 can be improved. A first sliding block 22 is disposed on a lower end of the first inner tube 9, and a lower end of the first sliding block 22 is disposed in the first sliding slot 21. As shown in FIGS. 11 to 13, when the telescopic rod assembly 3 is extended to its maximum position, first sliding block 22 abuts against a side wall of the first limiting block 20, thereby restricting further movement of the first inner tube 9 and preventing it from disengaging from the outer tube 4.

Figure 8:
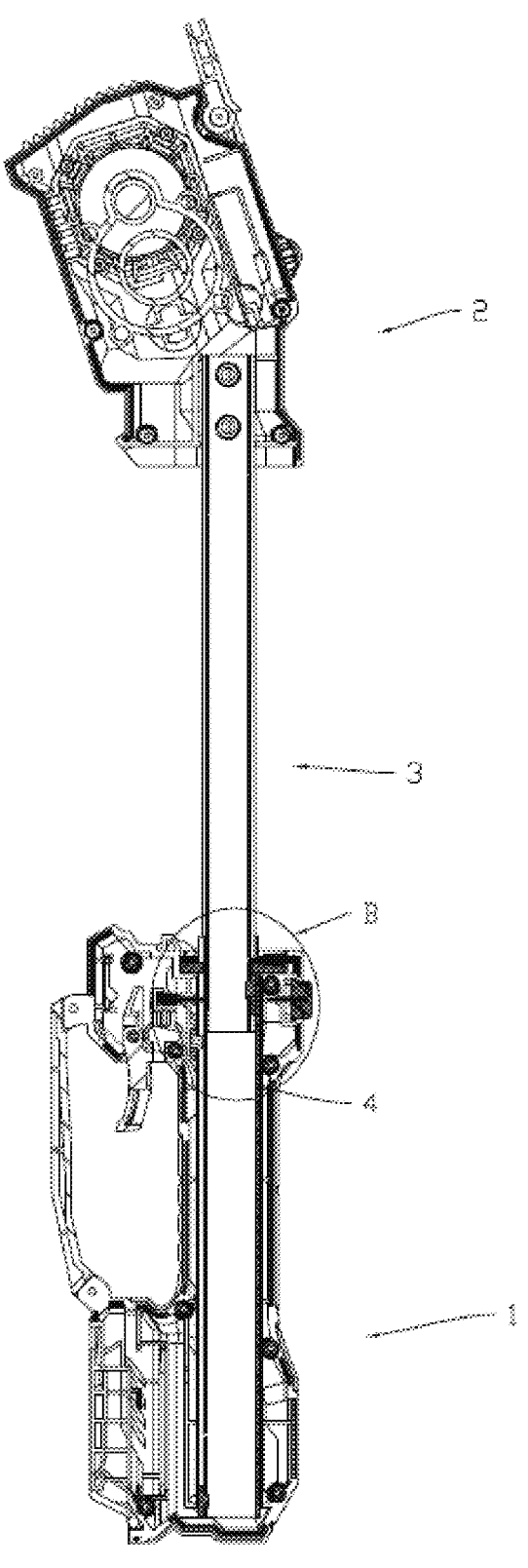
FIG. 8 illustrates a cross-sectional structural diagram taken along a line B-B illustrated in FIG. 7 of the disclosure.
Figure 9:
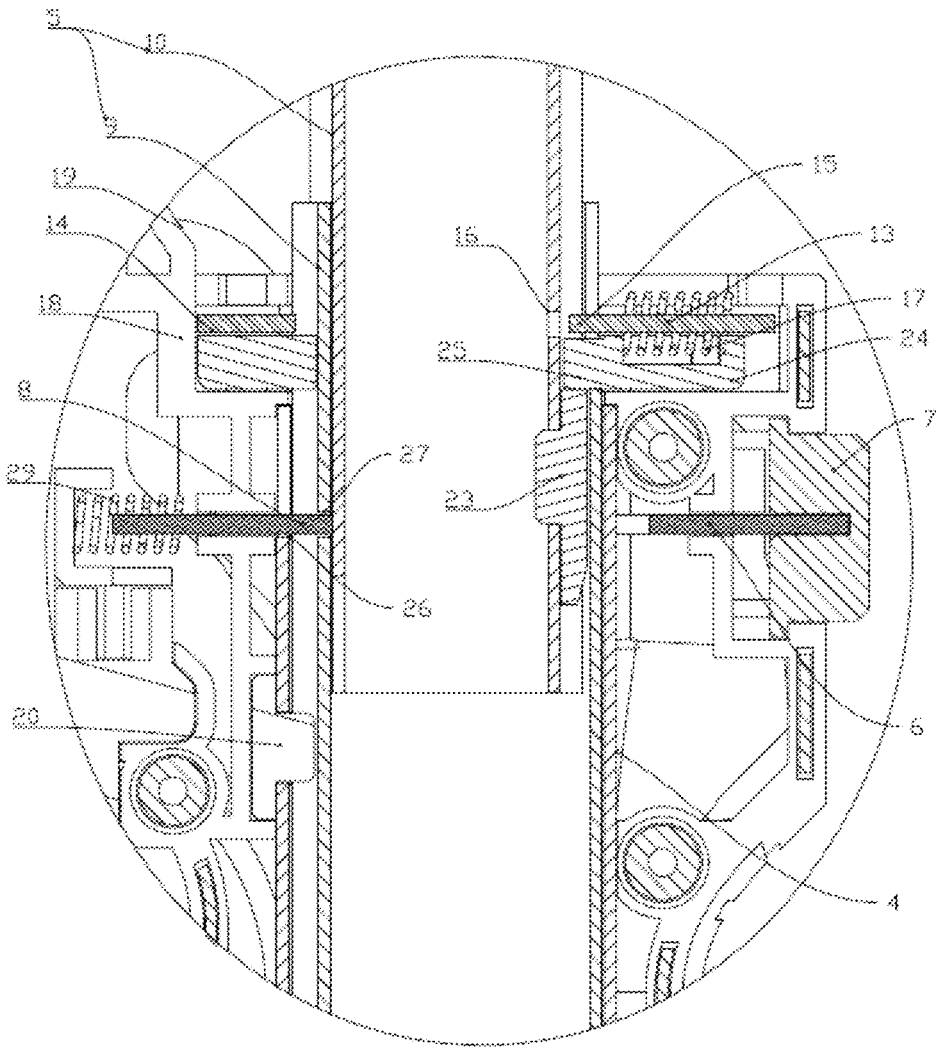
FIG. 9 illustrates an enlarged structural diagram of a portion B illustrated in FIG. 8 of the disclosure.
Figure 10:
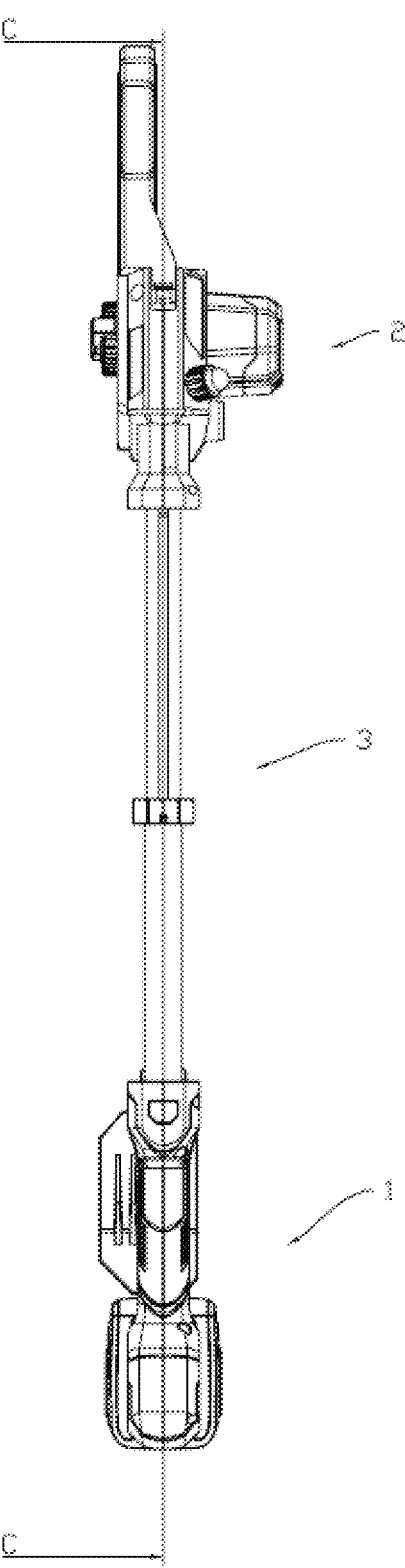
FIG. 10 illustrates a front schematic structural diagram of the telescopic electric chainsaw after completely extending of the disclosure.

In an embodiment, as shown in FIGS. 8 and 9, an upper end of the second inner tube 10 is connected to the main chainsaw body 2, a second limiting block 23 is disposed on the lower end of the second inner tube 10, a side cover 24 is disposed on a side of a limiting sleeve 12, and an interior of the side cover 24 includes a third limiting part 25 configured to allow the second limiting block 23 to abut against the third limiting part 25. When it is necessary to extend the electric chainsaw, first, the unlocking button 7 is pressed to disengage the first limiting part 8 from the second limiting hole 27 and the third limiting hole 28. Then the main chainsaw body 2 is pulled. The second inner tube 10 can be pulled out from the first inner tube 9 until the second inner tube 10 reaches its maximum position. At this point, the telescopic rod assembly 3 is in a partially extended state, and the second limiting block 23 abuts against the side wall of the third limiting part 25. The main chainsaw body 2 is continued to be pulled, then the second inner tube 10 can pull the first inner tube 9 out of the outer tube 4 through the cooperation of the second limiting block 23 and the third limiting part 25, further extending the telescopic rod assembly to its fully extended state.

Figure 5:
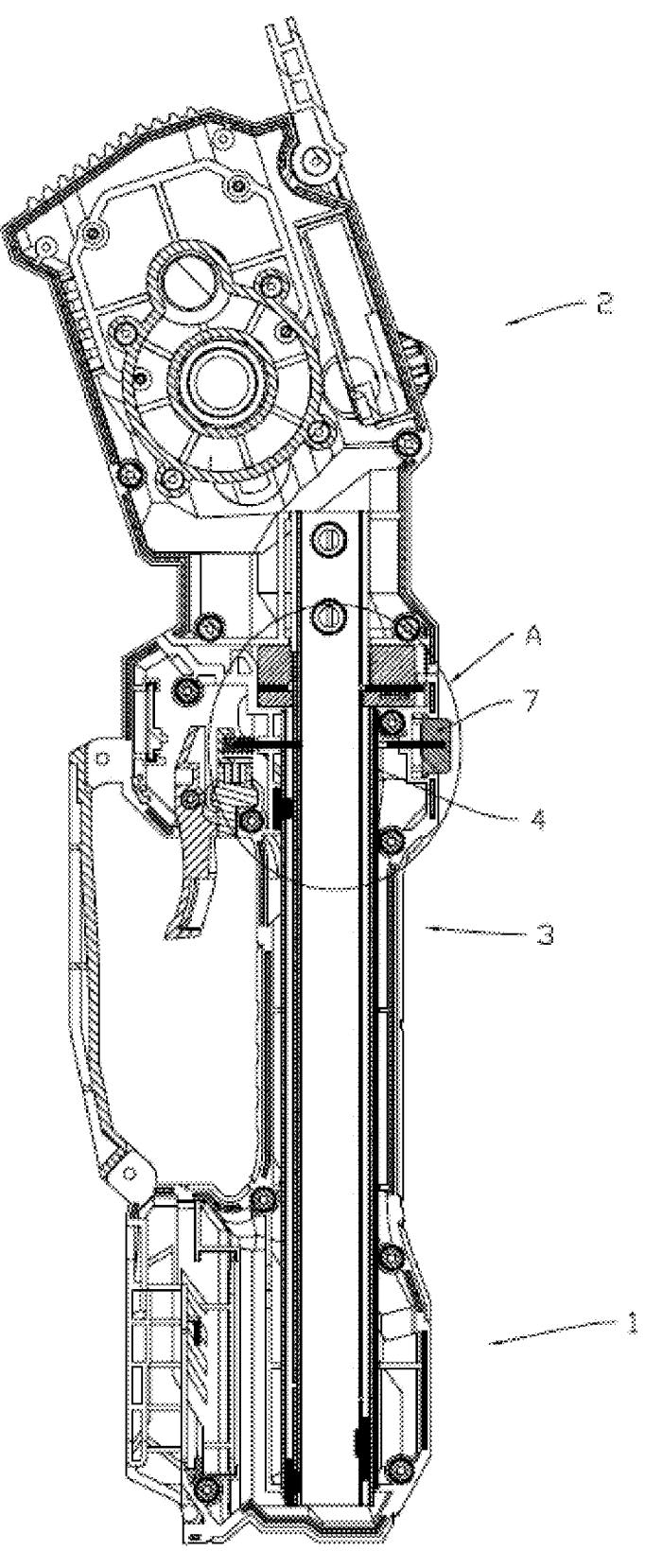
FIG. 5 illustrates a cross-sectional structural diagram taken along a line A-A illustrated in FIG. 4 of the disclosure.
Figure 6:
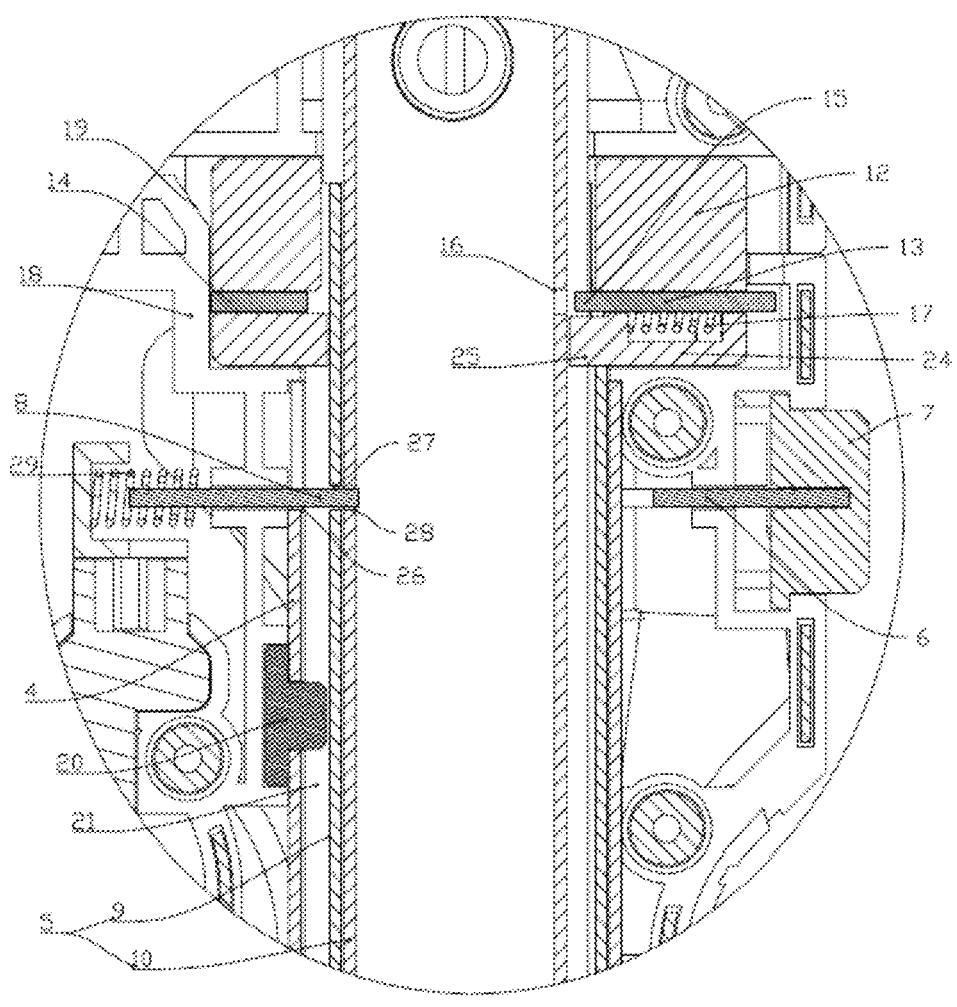
FIG. 6 illustrates an enlarged structural diagram of a portion A illustrated in FIG. 5 of the disclosure.
Figure 7:
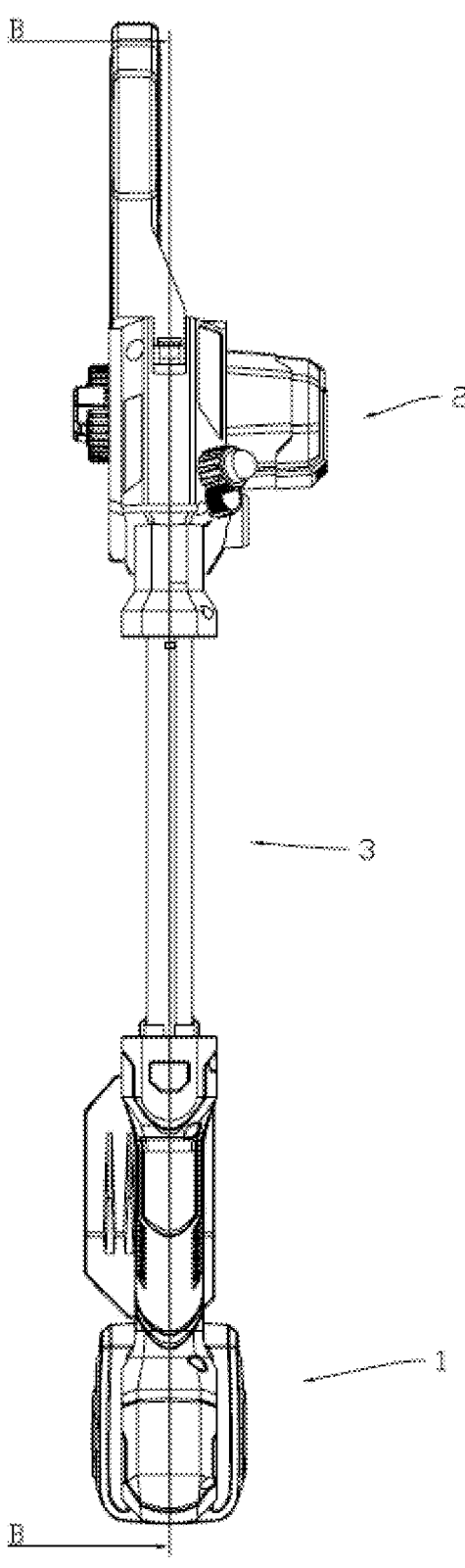
FIG. 7 illustrates a front structural diagram of the telescopic electric chainsaw when partially extended of the disclosure.

In an embodiment, as shown in FIGS. 5 and 6, the multiple limiting holes include: a first limiting hole 26, second limiting holes 27, and a third limiting hole 28. An upper end of the outer tube 4 define the first limiting hole 26, which allows the first limiting part 8 to be inserted into the second limiting hole 27 and the third limiting hole 28. An upper end and a lower end of the first inner tube 9 defines the second limiting holes 27, respectively. And an upper end of the second inner tube 10 defines the third limiting hole 28. When the telescopic rod assembly 3 is in a retracted state, the first limiting part 8 passes through the first limiting hole 26 and is engaged in both the second limiting hole 27 and the third limiting hole 28, thereby restricting the movement of the telescopic rod assembly 3 and keeping its position fixed. As shown in FIGS. 9 and 13, when the first inner tube 9 is extended, the first limiting part 8 passes through the first limiting hole 26 and is engaged in the second limiting hole 27, thereby restricting the movement of the first inner tube 9.

In an embodiment, the limiting assembly 11 includes a limiting sleeve 12 disposed on an outer periphery of the first inner tube 9, and a second limiting component 13 movably disposed inside the limiting sleeve 12, and a lower end of the second limiting component 13 extending out of the limiting sleeve 12 is provided with an unlocking part 14. An interior of the second limiting component 13 includes a second limiting part 15, and an upper end and a lower end of the second inner tube 10 define fourth limiting holes 16, respectively, and the fourth limiting holes 16 are configured to be inserted with the second limiting part 15. As shown in FIGS. 11 and 12, when the telescopic rod assembly 3 is fully extended, the second limiting part 15 is engaged in the fourth limiting hole 16 at the lower end of the second inner tube 10, thereby restricting the relative position between the second inner tube 10 and the first inner tube 9. When the telescopic rod assembly is fully extended, the relative movement restriction between the second inner tube 10 and the first inner tube 9 can be released by operating the unlocking part 14. Then, the second inner tube 10 can be retracted into the first inner tube 9, partially retracting the telescopic rod assembly 3 and achieving the effect of shortening its length. At this point, the second limiting part 15 is engaged in the fourth limiting hole 16 at the upper end of the second inner tube 10, thereby restricting the relative position between the second inner tube 10 and the first inner tube 9.

In an embodiment, a first reset spring 17 is disposed between and abuts against the second limiting component 13 and the limiting sleeve 12, and the first reset spring 17 is configured to make the second limiting part 15 tend to move to the fourth limiting holes 16. A front side of the handle 1 includes a limiting wall 18 configured to allow the lower end of the second limiting component 13 to abut against the limiting wall 18. As shown in FIGS. 6 and 9, when the first inner tube 9 is still inside the outer tube 4, the lower end of the second limiting component 13 abuts against the limiting wall 18. At this time, the second limiting part 15 does not engage with the fourth limiting hole 16, and thus does not restrict the relative movement between the first inner tube 9 and the second inner tube 10. As shown in FIGS. 11 and 12, when the first inner tube 9 is pulled out of the outer tube 4, the lower end of the second limiting component 13 no longer abuts against the limiting wall 18. Due to the action of the first reset spring 17, the second limiting component 13 will engage with the fourth limiting hole 16, thereby restricting the relative movement between the first inner tube 9 and the second inner tube 10 and preventing the second inner tube 10 from disengaging from the first inner tube 9.

In an embodiment, a front side of the limiting wall 18 includes an inclined sliding surface 19. During the process of retracting the telescopic rod assembly 3, the unlocking part 14 can slide along the inclined sliding surface 19, thereby causing the second limiting part 15 to automatically disengage from the fourth limiting hole 16. This action releases the restriction on the relative movement between the first inner tube 9 and the second inner tube 10.

A second reset spring 29 is disposed between and abuts against the handle 1 and the first limiting component 6, and the second reset spring 29 is configured to make the first limiting part 8 tend to move to the multiple limiting holes.

The above illustrates and describes the basic principles, main features, and advantages of the disclosure. Those skilled in the art should understand that the disclosure is not limited by the above-mentioned embodiments. The embodiments and descriptions in the specification are merely illustrative of the principles of the disclosure. Within the spirit and scope of the disclosure, there will be various changes and improvements, and these changes and improvements all fall within the scope of the disclosure as claimed. The scope of protection of the disclosure is defined by the appended claims and their equivalents.

What is claimed is:

1. A telescopic electric chainsaw, comprising:
a handle (1),
a main chainsaw body (2), and
a telescopic rod assembly (3), disposed between the handle (1) and the main chainsaw body (2),
wherein the telescopic rod assembly (3) comprises an outer tube (4) and an inner tube group (5); an end of the outer tube (4) is connected to the handle (1), and the inner tube group (5) is movably disposed inside the outer tube (4); a first limiting component (6) is disposed on an outer periphery of the telescopic rod assembly (3); and the first limiting component (6) is movably disposed inside the handle (1), an end of the first limiting component (6) extending out of the handle (1) is provided with an unlocking button (7), and an interior of the first limiting component (6) comprises a first limiting part (8);

wherein the inner tube group (5) comprises a first inner tube (9) and a second inner tube (10), the second inner tube (10) is connected to and movably disposed inside the first inner tube (9), a limiting assembly (11) is disposed between the first inner tube (9) and the second inner tube (10), and the second inner tube (10) is connected to the main chainsaw body (2); and a side wall of the outer tube (4) defines a first limiting hole (26), a side wall of two ends of the first inner tube (9) define second limiting holes (27) respectively, a side wall of the second inner tube (10) defines a third limiting hole (28), and the first limiting hole (26), the second limiting holes (27), and the third limiting hole (28) are configured to be inserted with the first limiting part (8);

wherein the limiting assembly (11) comprises a limiting sleeve (12) disposed on an outer periphery of the first inner tube (9), and a second limiting component (13) movably disposed inside the limiting sleeve (12), and an end of the second limiting component (13) extending out of the limiting sleeve (12) is provided with an unlocking part (14); and an interior of the second limiting component (13) comprises a second limiting part (15), a first end and a second end of the second inner tube (10) define fourth limiting holes (16) respectively, and the fourth limiting holes (16) are configured to be inserted with the second limiting part (15); and wherein a first reset spring (17) is disposed between and abuts against the second limiting component (13) and the limiting sleeve (12), and the first reset spring (17) is configured to make the second limiting part (15) tend to move to the fourth limiting holes (16); and a front side of the handle (1) comprises a limiting wall (18) configured to allow the end of the second limiting component (13) to abut against the limiting wall (18), and a front side of the limiting wall (18) comprises an inclined sliding surface (19).

2. The telescopic electric chainsaw as claimed in claim 1, wherein a first limiting block (20) is disposed on a second end of the outer tube (4), a side of the first inner tube (9) defines a first sliding slot (21) configured to allow the first limiting block (20) to slide in the first sliding slot (21), a first sliding block (22) is disposed on a first end of the first inner tube (9), and an end of the first sliding block (22) is disposed in the first sliding slot (21).

3. The telescopic electric chainsaw as claimed in claim 1, wherein the first end of the second inner tube (10) is connected to the main chainsaw body (2), a second limiting block (23) is disposed on the second end of the second inner tube (10), a side cover (24) is disposed on a side of the limiting sleeve (12), and an interior of the side cover (24) comprises a third limiting part (25) configured to allow the second limiting block (23) to abut against the third limiting part (25).

4. The telescopic electric chainsaw as claimed in claim 1, wherein a second reset spring (29) is disposed between and abuts against the handle (1) and a second end of the first limiting component (6), and the second reset spring (29) is configured to make the first limiting part (8) tend to move to the first limiting hole (26), the second limiting holes (27), and the third limiting hole (28).

\* \* \* \* \*